Dec. 29, 1936.  C. E. REED  2,065,740
CUTTER, SPINDLE AND ANTIFRICTION ASSEMBLY FOR EARTH BORING DRILLS
Filed March 5, 1935

Inventor:
Clarence E. Reed,
By Spear, Donaldson & Haley
Attorneys.

Patented Dec. 29, 1936

2,065,740

UNITED STATES PATENT OFFICE 2,065,740

CUTTER, SPINDLE, AND ANTIFRICTION ASSEMBLY FOR EARTH BORING DRILLS

Clarence E. Reed, Wichita, Kans., assignor to Chicago Pneumatic Tool Company, New York, N. Y., a corporation of New Jersey Application March 5, 1935, Serial No. 9,495

4 Claims. (Cl. 255—71)

The invention concerns a roller cutter, spindle and anti-friction bearing assembly for earth boring drills.

One object is to provide an assembly in which the spindle is a one piece construction particularly adapted for making up assemblies in earth boring drills of small diameter. In assemblies of small diameter the rotary cutters are necessarily small, and consequently the spindles are of small diameter and when these spindles are made up of main and supplemental sections the parts of the supplemental section are of such small diameter as to be subject to breakage under working loads.

Other objects of the invention will appear hereinafter.

Figure 1:
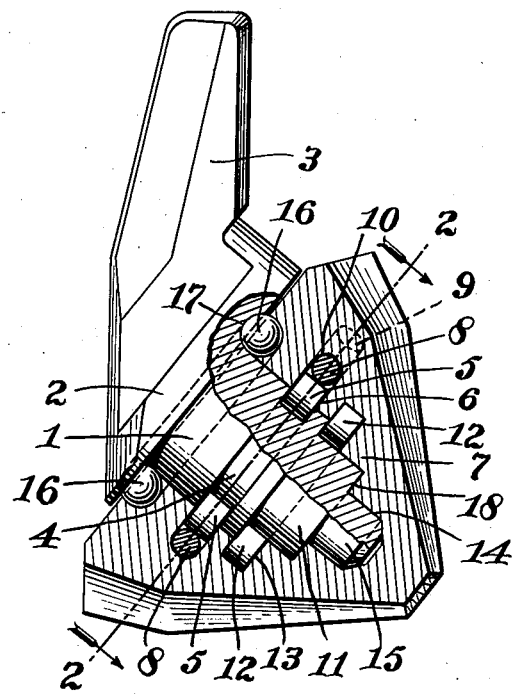

In the drawing Fig. 1 is a view of the invention partly in elevation and partly in section.

Figure 2:
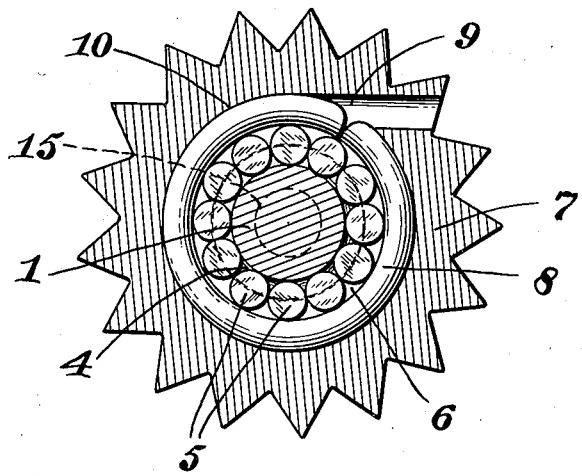

Fig. 2 is a transverse section substantially on line 2—2 of Fig. 1.

In this drawing 1 is the spindle integral with its support 2 which has a shank 3 by which the spindle and its support may be mounted in a drill head so that the spindle projects downwardly and inwardly towards the vertical axis of the drill head.

The spindle is made in one piece throughout. It has an annular groove 4 intermediate of its length to receive rolling locking members 5 which preferably are in the form of short cylindrical rollers or discs. These rolling locking members extend into a groove 6 in the wall of the bore of the rotary toothed cutter 7, the teeth on which may be of any desired formation and disposition. The annular groove 6 in the wall of the cutter bore is deep enough to receive the rollers 5 completely for the purpose of assembling the roller cutter on the spindle, so that in the act of threading the cutter onto the spindle these locking rollers will be located in the groove 6 of the cutter and after the cutter has been moved to its prescribed position on the spindle with the annular grooves 4 and 6 in registry, the locking rollers are forced inwardly towards the axis of the assembly so that the locking rollers will be seated partly in the groove 4 of the spindle and partly in the groove 6 of the cutter to perform their intended function of rotatively locking the roller cutter on the spindle. For thus moving the rolling locking members from their positions completely within the annular groove 6 of the cutter to a position partly in said groove 6 and partly in the groove 4 of the spindle, a filler strip 8 is used which is inserted through the passage 9 leading from the exterior of the cutter through the wall thereof to the bottom of the groove 6 of the cutter. This groove bottom as shown at 10 may be curved transversely, i. e. it may be semi-circular in cross section. The end of the filler strip in the act of insertion into the bottom portion of the groove 6 of the cutter will contact one after the other of the rollers 5 and force them radially inward of the assembly so that the whole row of locking members or discs finally will be seated in a position extending across the joint between the cutter and spindle and the cutter thus will be rotatively locked on the spindle.

The spindle has a portion 11 of reduced diameter which affords a track upon which anti-friction rolling bearings work in sustaining working loads. These bearings are shown at 12 in the form of rollers or discs. The bore of the cutter is reduced to correspond to the reduced diameter portion 11 of the spindle and in the wall of this reduced diameter bore the groove 13 is formed in which the anti-friction bearings 12 are seated.

The bore of the cutter is further reduced in diameter as at 14 to frictionally engage the reduced cylindrical centering end 15 of the spindle.

The cutter at its base face has a runway for anti-friction bearings 16 in the form of balls. These bear on a runway 17 at the junction of the spindle and its support. The bore of the cutter is formed to frictionally engage the cylindrical surfaces of the spindle at various points distributed along it from its support to its terminus so that the cutter is kept properly centered in respect to the axis about which it rotates thus avoiding any tendency to skew the roller bearings or roller locking means out of axial parallelism with the axis of the assembly.

Where I have referred to the locking effect secured by the locking rollers engaged in a groove, it will be understood that a rotative locking effect may be effected between the rotary locking means and a flange on the spindle.

The filler may be of various forms and various materials may be used. Preferably this filler may be of metal in the form of a wire having the necessary flexibility or pliability to conform to the annular groove in which it must be seated. When in place it is retained by plugging up the opening 9 or it may be retained by its own deformation or simply by the walls of the groove 6 in the cutter. It will retain the locking rollers 5 in their proper positions across the joint between the spindle and the roller cutter to serve as locking means.

The ball bearings take the end thrust of the cutter as well as the radial thrust. End thrust of the cutter may be taken also by the shoulder 18 at the junction of the small diameter cylindrical centering end 15 and the adjacent spindle portion of larger diameter. The roller bearings 12 take radial loads imposed on the cutter.

The locking rollers are not to take radial loads. Clearance will insure this effect. They will bear at their end faces upon the adjacent annular faces on the cutter and spindle in performing their locking function.

I claim:

1. A roller cutter unit comprising a roller cutter mounted for rotation on a spindle, the spindle being integral with a support and having a groove, rolling bearing raceways on the spindle, friction bearing areas on the spindle, said roller cutter enclosing the free end of the spindle and bearing on the spindle and rolling bearings in said raceways, the said cutter having a groove complementary to the groove in the spindle and deep enough to initially receive therein roller retaining means and permit the cutter to pass without obstruction over the spindle to operating position, and a filler inserted through a passage in the cutter into the groove thereof causing said roller retaining means to lay across the joint between the cutter and spindle, partly in the groove of the cutter and partly in the groove of the spindle.

2. A roller cutter unit comprising a roller cutter, a spindle therefor and supporting means, ball bearings receiving end thrust of the cutter positioned between the support and the roller cutter, roller bearings carrying radial loads positioned towards the free end of the spindle, and rolling retaining means positioned intermediate the balls and roller bearings, a groove in the spindle, a groove in the bore of the cutter complementary to the groove in the spindle, one of said grooves being adapted to initially receive the rolling retaining means to permit the cutter to pass without obstruction over the spindle to operating position thereon, and filler means afterwards inserted into the groove which initially received the said retaining means to position and hold the said rolling retaining means in position partly in each groove to rotatively lock the cutter on the spindle, said retaining means having rolling contact with said filler means.

3. In a roller cutter assembly, in combination a spindle and support integral with each other, a roller cutter enclosing the free end of the spindle, ball bearings between the cutter and spindle, roller bearings between the cutter and spindle sustaining radial loads, said cutter having frictional bearing on the spindle maintaining the cutter axially aligned on the rolling bearings, rolling retaining members lying across the joint between the spindle and cutter, and filler means holding said rolling retaining means in position and furnishing a track upon which said retaining means may roll.

4. A roller cutter and spindle assembly for earth boring drills comprising a one piece spindle, a roller cutter, anti-friction rolling bearings between the cutter and spindle and means for rotatively locking the roller cutter on the spindle comprising a row of individually rolling members in aligning annular recesses in the spindle and cutter and extending across the joint between said cutter and spindle, the annular recess in the cutter being deep enough to initially receive the rolling locking members to permit the roller cutter to be placed in prescribed position on the spindle, and filler material lying between the bottom of said deep recess and the individually rolling locking members to hold said members in locking position, and to furnish a track on which the locking members individually may roll.

CLARENCE E. REED.